US005932636A

United States Patent [19]

Neumann et al.

[11] Patent Number: 5,932,636

[45] Date of Patent: Aug. 3, 1999

[54] AQUEOUS DISPERSION OF IONIC ARALKYLATED EPOXY RESIN AND BLOCKED POLYISOCYANATE WITH POLYMERIZED MONOMERS

[75] Inventors: Uwe Neumann, Bad Schwalbach; Michael Hoenel, Wiesbaden; Achim Voelker, Wiesbaden; Gerd Walz, Wiesbaden; Susanne Wehner, Villmar; Peter Ziegler, Mainz, all of Germany

[73] Assignee: Vianova Resins GmbH, Mainz-Kastel, Germany

[21] Appl. No.: 08/841,332

[22] Filed: Apr. 30, 1997

Related U.S. Application Data

[63] Continuation of application No. 08/639,086, Apr. 24, 1996, abandoned, which is a continuation of application No. 08/493,810, Jun. 22, 1995, abandoned.

[30] Foreign Application Priority Data

| | | | |
|---|---|---|---|
| Jun. 30, 1994 | [DE] | Germany | 44 22 869 |
| Oct. 10, 1994 | [DE] | Germany | 44 36 093 |

[51] Int. Cl.[6] .......... C08K 3/20; C08L 63/02; C08F 283/10

[52] U.S. Cl. .......... 523/412; 523/409; 523/415; 528/98

[58] Field of Search .......... 523/409, 412, 523/415; 528/98

[56] References Cited

U.S. PATENT DOCUMENTS

| | | | |
|---|---|---|---|
| 3,523,925 | 8/1970 | Kamai et al. | 260/77.5 |
| 4,189,445 | 2/1980 | Oppenlaender et al. | 568/609 |
| 4,238,594 | 12/1980 | Pampouchidis | 528/69 |
| 4,297,261 | 10/1981 | Jozwiak, Jr. | 523/412 |
| 4,390,680 | 6/1983 | Nelson | 528/97 |
| 4,684,676 | 8/1987 | Diefenbach et al. | 523/411 |
| 4,865,704 | 9/1989 | Saatweber et al. | 523/411 |
| 5,272,188 | 12/1993 | Kriessmann et al. | 523/412 |
| 5,300,618 | 4/1994 | Durairaj | 528/101 |
| 5,565,508 | 10/1996 | Hoenel et al. | 523/414 |

FOREIGN PATENT DOCUMENTS

| | | |
|---|---|---|
| 2122570 | 10/1994 | Canada . |
| 189728 | 8/1986 | European Pat. Off. . |

OTHER PUBLICATIONS

Derwent accession No. 86–193466/30 for Japanese Patent No. 61–126184, Nippon Oils & Fats KK, Jun. 1986.

*Primary Examiner*—Robert E. Sellers
*Attorney, Agent, or Firm*—Foley & Lardner

[57] ABSTRACT

Aqueous synthetic resin dispersions comprising (A) an ionic resin, based on aralkylated epoxy resins, (B) a blocked polyisocyanate and (C) a polymer of at least one olefinically unsaturated monomer which is capable of undergoing free-radical polymerization are useful, for example, as binders in processes of coating by electrodeposition.

16 Claims, No Drawings

AQUEOUS DISPERSION OF IONIC ARALKYLATED EPOXY RESIN AND BLOCKED POLYISOCYANATE WITH POLYMERIZED MONOMERS

This application is a continuation of application Ser. No. 08/639,086, filed Apr. 24, 1996 abandoned, which is a continuation of application Ser. No. 08/493,810, filed Jun. 22, 1995, now abandoned.

BACKGROUND OF THE INVENTION

In coating by electrodeposition, the electrodeposition coating materials preferably employed are those which contain, as binder, cationic, amine-modified epoxy resins as a water-soluble based resin component, and polyisocyanates blocked with alcohols and/or amines as a crosslinking agent.

For reasons of corrosion prevention, it is currently preferred to employ epoxy resins synthesized on the basis of bisphenol A, which are reacted with amines in protic solvents such as alcohols and glycols and/or aprotic solvents such as ketones and aromatic compounds in order to render them soluble in water.

It is these bisphenol A-based epoxy resins, in particular, which are outstandingly suitable for corrosion prevention and are therefore preferably employed for the synthesis of amine-modified epoxy resins.

In order to prepare the individual binder components, for reasons of viscosity or reactivity, it is necessary to employ solvents. For instance, in the synthesis of the base resins, protic (e.g., alcohols, glycols) and aprotic (e.g., ketones, esters or aromatic compounds) solvents are used, and aprotic solvents are used in the synthesis of the crosslinking component.

However, as is known, as the solvent content of cathodic electrodeposition (CED) coating baths increases, the throwing power (coating of cavities) is impaired, instances of excessive coating occur, and an increased quantity of solvent passes into the waste water and/or the waste air. For these reasons the solvents have to be stripped off from the binders before and/or after dispersion in water, for example, by distillation or ultrafiltration. These methods result in a portion of the solvents remaining in the dispersions, and, especially during so-called "stripping" in the aqueous phase and during ultrafiltration, relatively large quantities are obtained of a solvent-water mixture which has to be disposed of.

In DE-A 43 14 297, improved synthetic resin dispersions are described which give coatings having a good resistance in, for example, the salt spray test.

A parameter which requires improvement in the unsaturated monomers specified in DE-A-43 14 297 and which are used as solvents for the synthesis of binders, is their compatibility or "interaction" with the polar epoxy-amine adducts based on epoxy resins.

This incompatibility is manifested, for example, in the increased viscosity a) of the epoxy-amine adducts prepared in monomers (especially aromatic vinyl compounds such as styrene) and b) in the melt viscosity during the baking procedure.

SUMMARY OF THE INVENTION

An object of the present invention is, therefore, to develop a simplified and ecologically acceptable process for the preparation of aqueous CED binder dispersions which are substantially free from organic solvents.

It is also an object to provide aqueous synthetic resin dispersions, which can be prepared with a minimum amount of organic solvent.

It is also an object of the invention to improve compatibility between an epoxy resin and a polymer formed from unsaturated monomers.

It is also an object of the invention to provide methods of using such dispersions.

In accordance with these objects, there has been provided an aqueous synthetic resin dispersion comprising (A) an ionic resin containing moities derived from aralkylated epoxy resins, (B) a blocked polyisocyanate, and (C) a polymer of at least one olefinically unsaturated monomer which is capable of undergoing free-radical polymerization, wherein a bisphenol substituted with at least one aralkyl group is employed for the synthesis of the epoxy resin whereby the epoxy resin or epoxy of the amino-epoxy resin is aralkylated.

In accordance with other aspects of the invention, there is provided a process for the preparation of an aqueous synthetic resin dispersion as described above, which comprises converting a mixture of at least one vinyl monomer capable of undergoing free radical polymerization to form polymer (C), one ionic resin (A), and one partially or completely blocked di- or polyisocyanate into an aqueous dispersion and polymerizing this dispersion with the addition of a free-radical initiator.

In accordance with other aspects of the invention, there is provided a binder useful for electrodeposition coating processes, containing a dispersion as described above.

Further objects, features and advantages of the present invention will become apparent from the detailed description of preferred embodiments that follow.

DETAILED DESCRIPTION OF THE PREFERRED EMBODIMENTS

Surprisingly it has been found by the present inventors to be possible to optimize the interaction between epoxy resin and/or epoxy-amine adduct and monomer, especially aromatic vinyl compounds such as styrene, by carrying out a reaction, in the manner of a Friedel-Crafts alkylation, of bisphenol A with alkenylaromatic compounds and using the bisphenol A derivatives whose side-chains have been modified in this way (a) to synthesize an epoxy resin or (b) to synthesize an epoxy-amine adduct. The preparation of this binder component preferably takes place in the presence of unsaturated monomers which are subsequently converted, for example, by emulsion or suspension polymerization, into water-insoluble polymers. In this way, aqueous dispersions are obtained which, surprisingly, are stable in the pH range from 5 to 8.

The invention provides aqueous synthetic resin dispersions comprising (A) an ionic resin based on epoxy resins aralkylated, for example, in accordance with a Friedel-Crafts method, (B) a blocked polyisocyanate, and a polymer of at least one olefinically unsaturated monomer (C) which is capable of undergoing free-radical polymerization. Some or all of the bisphenols employed for the synthesis of the epoxy resin are substituted with at least one aralkyl group. The epoxy resins are preferably based on bisphenols.

The aqueous synthetic resin dispersions according to the invention are preferably prepared by converting a mixture of at least one monomer (C), an ionic epoxy or epoxy-amine resin (A) and a blocked polyisocyanate (B) into an aqueous dispersion and subjecting this dispersion to free-radical polymerization.

Suitable ionic resins (A) include any known in the art which are based on or formed from epoxides which are formed from aralkylated bisphenol, including both anionic and cationic resins. Cationic resins are preferred because of their better throwing power and corrosion prevention. The cationic resins preferably contain one or more groups having an active hydrogen atom, such as hydroxyl, primary or secondary amino, and/or thiol groups. These groups serve as reactive centers when the coating material is cured with crosslinking agents such as, for example, blocked polyisocyanates.

Component (A) is preferably an amino-epoxy resin which is water-dilutable by neutralization with organic acids. The amino-epoxy resins may be analogous to those known in the art, but an aralkylated bisphenol is employed to make the resin. The amino-epoxy resins may have any desired properties, but generally have an amine number of from 30 to 150 mg of KOH/g, a hydroxyl number of from 50 to 500 mg of KOH/g and a number-average molecular mass (Mn) of from 250 to 10,000 g/mol, preferably from 300 to 5000 g/mol. The lower limit for the amine number should preferably be 45, particularly preferably 70, while the upper limit should preferably be 120, particularly preferably 100, mg of KOH/g. If the amine number is too low, then the solubility may be insufficient, or an excessive degree of neutralization leads to excessive pH values in the deposition baths. If the amine number is too high, then the deposition may result in a poorly adhering film or a blistered surface.

Examples of amino-epoxy resins include reaction products of epoxide-containing resins, preferably having terminal epoxide groups, such as polyglycidyl ethers, polyglycidyl esters, and polyglycidyl amines with saturated and/or unsaturated secondary and/or primary amines or amino alcohols respectively. These may be modified by at least one primary and/or secondary hydroxyl group, by a dialkylamino group and/or by a primary amino group which is temporarily protected by ketimine formation.

Amino-epoxy resins containing hydroxyl groups are expediently obtained from polyglycidyl ethers having preferably two 1,2-epoxide groups per molecule. Polyglycidyl ethers are preferably those polyglycidyl ethers, aralkylated by a Friedel-Crafts method, of the formula

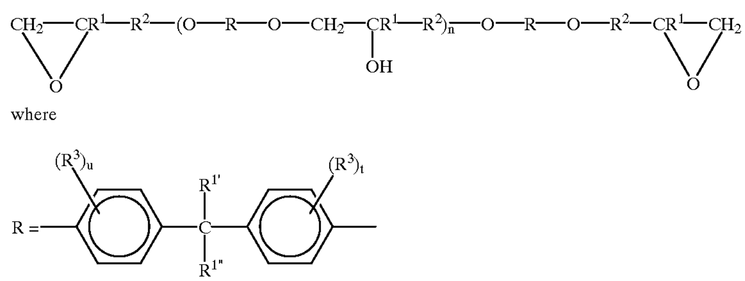

where $R^1$, $R^{1'}$, $R^{1''}$ are each independently of one another —H and/or —$C_mH_{2m}$,
$R^2$ is —$(CHR^4)_m$—, preferably —$CH_2$—,
$R^3$,$R^{3'}$ are each independently of one another —H and/or —$C_mH_{2m+1}$, halogen or preferably —H,
$R^4$ is H or a lower (i.e., having 1 to 6 carbon atoms) alkyl radical which is provided, if desired, with various substituents selected from $C_1$–$C_4$ alkyl and $C_1$–$C_4$ alkoxy groups,
n is 0 to 8, preferably 1 to 6,
m is 1 to 8, preferably 1,
t,u are each independently of one another 0 to 4.

These polyglycidyl ethers are usually obtained by reacting, in a first step, one or more of the compounds such as, for example, 4,4'-dihydroxydiphenylmethane (bisphenol F), 4,4'-dihydroxydiphenylpropane (bisphenol A), 4,4'-dihydroxybenzophenone and isomers of dihydroxynaphthalene with alkenylaromatic compounds, employing acid catalysis, in the manner of a Friedel-Crafts alkylation, and then reacting the products with a reactive epoxide compound such as a halohydrin (e.g., epichlorohydrin or methylepichlorohydrin).

A method for the preparation of the aralkylated polyphenols which are suitable for the invention is described in the German application P 44 36 097.5, which corresponds to U.S. Ser. Number 08/493,571, filed Jun. 22, 1995, pending, all of which are hereby incorporated by reference in their entirety.

The building blocks for polyglycidyl ethers, which building blocks are modified in accordance with the invention are generally obtained (a) by reacting epihalohydrins such as epichlorohydrin or methylepichlorohydrin with aralkylated diphenol, to give polyglycidyl ethers, having a preferred number-average molecular mass Mn of from about 300 to 5000 g/mol and a preferred epoxide equivalent weight (molecular mass divided by the average number of epoxide groups per molecule) of from about 170 to 2500 g/mol. Polyepoxides with a suitable molecular mass are prepared either by selecting the molar ratios of aralkylated diphenol and, for example, epichlorohydrin or by reacting the monomeric diglycidyl compounds with further aralkylated bisphenol, with the addition of catalysts such as Lewis acids, Lewis bases, or phosphonium salts.

Particular preference is given to epoxy resins prepared from bisphenols which have been modified by reaction with styrene. However, any desired aralkyls or combination thereof can be used to modify the bisphenols such as the vinyl toluene isomers, indene, halogenated styrene, methoxy styrene, and vinyl naphthalene.

The epoxy resins may be completely or partially hydrogenated, or may be employed as mixtures of different structure and molecular mass. Furthermore, elastication can be achieved by replacing a portion of the polyglycidyl ether described above by aliphatic polyglycidyl ethers of the formula

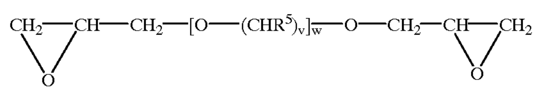

where $R^5$ is H or is a lower alkyl radical (having 1 to 6 carbon atoms) which is optionally provided with various substituents, selected from $C_1$–$C_4$ alkyl and $C_1$–$C_4$ alkoxy groups, v is a number from 2 to 6, and w is a number from 5 to 50.

Examples of these modifiers include bisglycidyl ethers of polypropylene glycol or polybutylene glycol having various molecular masses.

The modified epoxy resins can also be modified by reaction with long-chain polyols such as 1,6-hexanediol, neopentylglycol, bisethoxylated neopentylglycol, neopentylglycol hydroxypivalate and bis (hydroxymethyl) cyclohexane, monoanhydropentaerythritol and also polytetrahydrofurandiol, polycaprolactonediol, polycaprolactamdiol or polybutadienediol in the presence of appropriate basic or acid catalysts, such as boron fluoride-amine complexes. Whereas polyols having primary OH groups can be reacted directly with polyglycidyl ethers, given suitable catalysis, secondary OH groups are generally reacted first of all with diisocyanate. The resulting NCO-terminated reaction product can then easily be incorporated as a bridge between 2 mol of polyglycidyl ether, enlarging the molecule and increasing the functionality.

In order to reduce the amine number, the aralkylated epoxy resin can also be modified with saturated or unsaturated polycarboxylic acids and/or hydroxyalkyl carboxylic acids. Examples of aliphatic, cycloaliphatic and/or aromatic polycarboxylic acids of various chain lengths include adipic acid, sebacic acid, fumaric acid, isophthalic acid and dimeric fatty acids. The term hydroxyalkyl carboxylic acids is understood to refer to lactic acid, dimethylolpropionic acid or, alternatively, polyesters containing carboxyl and hydroxyl groups. The reaction of excess polyglycidyl ether of low molecular weight with polycarboxylic acids and/or polyalcohols produces modified polyglycidyl ethers as the intermediate stage, which are then reacted further with amines and/or amino alcohols.

It is also possible to use heterocyclic polyepoxide compounds such as 1,3-diglycidyl-5,5-dimethylhydantoin, triglycidyl isocyanurate or diepoxides of bisimides. Another suitable class of polyepoxides is that of polyglycidyl ethers of phenolic novolak resins, whereby the functionality can be increased from 2 up to about 6 glycidyl groups per molecule. In addition, by defunctionalization with long-chain alkylphenols such as dodecylphenol, it is also possible to incorporate elasticating elements. Other possibilities for use are polyglycidyl esters of polycarboxylic acids, such as diglycidyl hexahydrophthalate, diglycidyl tetrahydrophthalate or diglycidyl fumarate.

If an amino-epoxy resin is desired, the introduction of the amino groups into the epoxy resin is carried out in any desired manner, generally either by addition of NH-reactive compounds to the epoxide group or by reacting the hydroxyl groups of the base resin with basic monoisocyanates, which are formed by reacting aromatic and/or aliphatic and/or cycloaliphatic di- or polyisocyanates with dialkylaminoalkanol (cf. DE-A 27 07 405).

NH-reactive compounds include any known in the art such as primary amines selected from linear and branched alkyl amines and alkanol amines having 1 to 12 carbon atoms in the alkyl or alkanol radical, such as methylamine, ethylamine, propylamine, butylamine, octylamine, monoethanolamine and 2-ethylhexylamine, from dialkylaminoalkylamines and alkoxyalkylamines having a total of 3 to 14 carbon atoms, such as dimethylaminopropylamine, diethylaminoethylamine, dimethylaminoneopentylamine or methoxypropylamine and/or, preferably, secondary amines such as dialkylamines, monoalkylhydroxyalkylamines, dihydroxyalkylamines and cyclic amines having a total of 2 to 14 carbon atoms. Examples of such compounds include dimethylamine, diethylamine, dipropylamine, dibutylamine, methylbutylamine, dimethylaminopropylamine, N-methylaminoethanol or diethanolamine, or else cyclic amines such as morpholine or oxazolidine. When using the primary amines, the amine reacts with one or two epoxide groups depending on the stoichiometric ratios available, with enlargement of the molecule.

It is also useful to employ primary amines of the formula

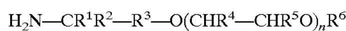

$$H_2N—CR^1R^2—R^3—O(CHR^4—CHR^5O)_nR^6$$

or secondary amines of the formula

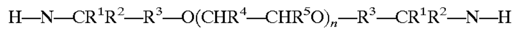

$$H—N—CR^1R^2—R^3—O(CHR^4—CHR^5O)_n—R^3—CR^1R^2—N—H$$

to modify the epoxy resins.

In these formulas, $R^1$ and $R^2$ are hydrogen, or $C_1$ to $C_4$ alkyl or $—CH_2—OH$ groups, $R^3$ is a linear or branched alkylene radical, especially an alkylene radical having 1 to 3 carbon atoms, $R^4$ and $R^5$ are hydrogen or alkyl radicals having 1 to 4 carbon atoms, $R^6$ is hydrogen or an alkyl, cycloalkyl or phenyl radical, preferably an alkyl radical having 1 to 6 carbon atoms, and n is an integer from 0 to 5.

Examples of such monoamines include ethanolamine, propanolamine, butanolamine, ethylene glycol 3-aminoethyl ether ($H_2N—CH_2—CH_2—O—CH_2—CH_2—OH$) and diethylene glycol mono(3-aminopropyl) ether ($H_2N—(CH_2)_3—O—CH_2—CH_2—O—CH_2—CH_2—OH$). When primary amines are used, the amine reacts with the epoxide group depending on the stoichiometric ratios available, with enlargement of the molecule. Examples of diamines include the Jeffamine® M series, the Jeffamine® D series, and the Jeffamine® ED series.

Also suitable are di- or triamine having primary and/or secondary amino groups, such as laurylpropylenediamine and tallow fatty-propylenediamine.

With secondary diamines, chain extension occurs. The secondary diamines used, preferably long-chain diamines, include N,N'-dialkyldiaminoalkanes such as, for example, N,N'-bis(isohexyl)-1,6-diaminohexane, N,N'-bis(isohexyl) isophoronediamine,N,N'-bis(isohexyl) dimethylhexamethylenediamine,N,N'-bis(isohexyl)-2-methylpentamethylenediamine, N,N'-bis(isohexyl) ethylenediamine and N,N'-bis(isohexyl)-di(4-aminocyclohexyl)methane or reaction products of saturated glycidyl ethers or glycidyl esters or epoxyalkanes with primary diaminoalkanes, such as the addition product of 1,6-hexanediamine with 2 mol of glycidyl ester of Versatic® acids (α-branched monocarboxylic acids, especially with 5 to 11 carbon atoms).

Monoepoxides which can be employed for this purpose include saturated or unsaturated glycidyl ethers or α-epoxides of various chain lengths, such as 1,2-epoxydodecane or butylene oxide. The appropriate number of hydroxyl groups arises, on the one hand, automatically from the epoxide group during addition of the secondary amino groups, while on the other hand it can be controlled by using hydroxyalkylamines. In addition, secondary diamines which can be employed are the reaction product of 2 mol of 2-ethylhexylamine with 1 mol of Beckopoxs EP 075 (diglycidyl ether based on propylene oxide) and/or 1 mol of Beckopoxs EP 140 (Epikote® 828), and also aliphatic secondary diamines based on propylene oxide adducts of diols or triols, for example, Novamins grades.

The molar ratios between compounds containing epoxide and amino groups should preferably be selected such that the complete incorporation of the amine is ensured, since otherwise rupture-like surface defects may occur during electrophoretic coating, i.e., a slight excess of epoxide groups is advantageous.

All of the amine to be used can be reacted simultaneously with the compounds containing epoxide groups, or a stepwise procedure can be followed. The reaction of the amines commences even at room temperature and is generally exothermic. In order to achieve complete reaction, it is generally necessary to increase the temperature temporarily to about 50 to 120° C. For the preparation of the amino-epoxy resin, an advantageous procedure is one in which the epoxy resin is first of all dissolved in one or more olefinically unsaturated monomers which are capable of undergoing free-radical polymerization, and the solution is then reacted with the amines.

For crosslinking reactions, hydroxyl groups must generally always be present in the epoxy or amino-epoxy resin. The hydroxyl number in the molecule (expressed in mg KOH per gram of solid resin) is important for the crosslinkability of the film, and should be over 50, preferably over 100 and, with particular advantage, over 150 mg/g. The upper limit of the hydroxyl number is 400–500 more advantageously below 300 mg/g. If the hydroxyl number is too low, then crosslinking gives rise to films which are still soluble in organic solvents such as methyl ethyl ketone. If, on the other hand, the hydroxyl number is too high, then the film becomes too brittle and may possibly also be too hydrophilic. The molecule should contain at least two crosslinkable, preferably primary hydroxyl groups.

The primary and/or secondary hydroxyl groups which are important for the crosslinking process may in part be replaced by primary and/or secondary amino groups. The introduction of primary amino groups into the basic resin structure is preferably carried out by reacting resins containing at least one, preferably at least two, epoxide groups per molecule with an amino- and/or hydroxyl-containing ketimine and/or aldimine and/or polyamine. The ketimines are prepared in accordance with known methods, by eliminating water from the corresponding polyamines of structure R—NR—R—$NH_2$ or the corresponding amino alcohols of structure HO—R—$NH_2$ and the appropriate aliphatic ketones, such as diethyl ketone, methyl isobutyl ketone or ethyl n-propyl ketone, or else cyclopentanone, cyclohexanone, acetophenone, etc. Preferred ketimines are reaction products of methyl isobutyl ketone and diethylenetriamine. The reaction conditions (reaction temperature, choice of solvent) must be chosen such that no substances which decompose the ketimine bond, such as water, remain present in the reaction product.

The ketimine protects the primary amino group (cf. U.S. Pat. No. 3,523,925), so that the amine can be reacted without difficulties with the epoxy base resin via a further functional group, for example, a hydroxyl group or, preferably, a secondary amino group. The choice of the molar ratios of the components employed must ensure that no unreacted low molecular weight amine remains in the batch, since otherwise rupture-like surface defects occur during electrophoretic coating. The reaction of the secondary amino groups of the polyaminoketimine with the epoxide group commences even at room temperature and is generally exothermic. In order to achieve complete reaction, it is generally necessary to increase the temperature temporarily to from 50 to 120° C.

Any desired blocked polyisocyanates (component B) may be used in the dispersion. They are generally prepared by reacting a polyfunctional isocyanate with an at least stoichiometric quantity of a monofunctional compound which contains active hydrogen (known as the Zerewitinoff reaction) with the possible addition, if desired, of basic catalysts such as tertiary amines or small amounts of tin salts such as dibutyltin dilaurate. In this way, the isocyanate is protected at room temperature against reaction with water or alcohols. The protective group is eliminated again at baking temperatures of less than 210° C., preferably less than 190° C. and in particular under 180° C., but on the other hand above 110° C., preferably above 150° C., so that the unblocked isocyanate group can react with the hydroxyl groups of the base epoxy resin.

Agents which block the isocyanates generally contain only one amine, amide, lactam, thio, or hydroxyl group. Compounds which have proven suitable include, for example, aliphatic or cycloaliphatic alcohols such as 2-ethylhexanol, dialkylamino alcohols such as dimethylaminoethanol, oximes such as methyl ethyl ketoxime, lactams such as ε-caprolactam or 2-pyrrolidone, imides such as phthalimide or N-hydroxymaleimide, hydroxyalkyl esters, malonic esters or acetoacetic esters. β-hydroxy glycols or β-hydroxy glycol ethers and glycol amides are also recommended. Preference is also given to those isocyanate compounds in which a portion (between 10 and 50 per cent) of the blocking agent contains at least one olefinically unsaturated group. Examples of corresponding blocking agents are the hydroxyalkyl (meth)acrylates.

Typical and suitable polyfunctional isocyanates to be blocked include aliphatic, cycloaliphatic, araliphatic and/or aromatic polyisocyanates having at least two isocyanate groups per molecule. Suitable aromatic diisocyanates and polyisocyanates include the isomers or isomer mixtures of phenylene diisocyanate, tolylene diisocyanate, xylylene diisocyanate, biphenylene diisocyanate, naphthylenediisocyanate and diphenylmethane diisocyanate, diphenyltetraisocyanate, preferably naphthyl tetraisocyanate, tolylene diisocyanate, isophorone diisocyanate and xylylene diisocyanate.

Because of their good resistance to ultraviolet light, (cyclo)aliphatic diisocyanates give products with little tendency to yellowing. Examples thereof are isophorone diisocyanate, cyclopentylene diisocyanate, and the hydrogenation products of the aromatic diisocyanates, such as cyclohexylene diisocyanate, methylcyclohexylene diisocyanate and dicyclohexylmethane diisocyanate.

Aliphatic diisocyanates include compounds of the formula

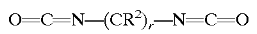

$$O{=}C{=}N{-}(CR^2)_r{-}N{=}C{=}O$$

in which r is an integer from 2 to 20, in particular from 6 to 8, and $R^2$ is hydrogen or a lower alkyl radical having 1 to 8 carbon atoms, preferably 1 or 2 carbon atoms. Examples thereof include trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Particularly preferred diisocyanates are isophorone diisocyanate, dicyclohexylmethane diisocyanate, diphenylmethane diisocyanate, trimethylene diisocyanate, tetramethylene diisocyanate or tolylene diisocyanate.

Vinyl polymers which contain isocyanate groups and are prepared by copolymerization of, for example, cyanatoethyl (meth) acrylate or dimethylisopropylbenzyl isocyanate with alkyl (meth)acrylates and/or (alkyl)vinyl-benzenes can also be used. Also suitable are mixed aliphatic/aromatic isocyanate compounds.

Polyisocyanates which have also proven suitable are products which are prepared by trimerization or oligomerization of the above mentioned diisocyanates or by reaction of these diisocyanates with polyfunctional compounds containing OH or NH groups. If necessary, the average functionality can be reduced, for example, by addition of monoisocyanates. Examples of such chain-terminating monoisocyanates include phenyl isocyanate, cyclohexyl isocyanate and stearyl isocyanate.

An enlargement of the polyisocyanate molecule can also be brought about by reaction with polyalcohols which contain tertiary amino groups, such as N-methyldiethanolamine or triethanolamine, or polyamines containing tertiary amino groups, such as 3-methyl-3-(2-aminoethyl-) aminopropylene. In order to improve the solubility, it is also possible to employ chain-terminating N-dialkylamino alcohols such as dimethylaminoethanol or N,N-dialkylalkylenediamine such as dimethylaminopropylene or N,N-diethyl-N'-methyl-1,2-ethanediamine. Isocyanate-containing prepolymers based on polyglycol ethers, polyesterpolyols, polyetherpolyols, polycaprolactonepolyols and/or polycaprolactampolyols can likewise be employed with advantage.

For the synthesis of the blocked polyisocyanate, the corresponding mono- or diisocyanate can be dissolved, prior to adding the blocking agent, in the olefinically unsaturated compounds (C) or mixtures thereof which are required for the preparation of the polymer (C), or in aprotic solvents such as, for example, toluene, xylene or methyl isobutyl ketone. As an alternative to this, the unsaturated monomer or aprotic solvent such as those mentioned above can also be added to the isocyanate after the addition of the blocking agent.

Another variant comprises only semi-blocking the described diisocyanates, in a stoichiometrically appropriate manner, for example, with the described monoalcohols and/or amines, in which case reaction products of butylglycol or butyldiglycol with tolylene diisocyanate and methyl ethyl ketoxime with isophorone diisocyanate and tetramethylxylylene diisocyanate are preferred. The semi-blocking can be carried out in bulk, without solvent, or in the monomers (C) described. Such semi-blocked diisocyanates are then subjected to an addition reaction by the remaining NCO function, either before or preferably after the reaction of the epoxy resins with the amines, with the free hydroxyl and/or amino groups of the epoxy resin or the amino-epoxy resin, this addition reaction preferably being carried out in the presence of the monomers (C) described. In this manner, so-called autocrosslinking systems are obtained, which are likewise a subject of this invention. In order to achieve a balance in terms of performance properties, an autocrosslinking system may be admixed in part with a blocked polyisocyanate (B).

Suitable unsaturated monomers used to form polymer (C), which may already be present during the synthesis of the amino-epoxy resin or else during the synthesis of the blocked isocyanate or are added after the synthesis thereof include one or more of any known in the art, such as, vinyl monomers: aromatic vinyl compounds such as styrene, methylstyrenes, and halostyrenes; vinyl ethers; vinyl esters of aliphatic monocarboxylic acids having 2 to 18 carbon atoms, such as vinyl acetate, vinyl propionate and vinyl stearate; esters of α,β-unsaturated acids such as alkyl (meth) acrylates, alkyl fumarates, alkyl maleates having 1 to 12 carbon atoms in the alkyl group; monoesters of α,β-unsaturated acids with polyhydric alcohols, such as hydroxyalkyl (meth)acrylates, hydroxyalkyl crotonates having 2 to 12 carbon atoms and from one to three free hydroxyl groups in the alcohol group, such as hydroxyethyl and hydroxypropyl (meth)acrylate, neopentylglycol mono (meth)acrylate, trimethylolpropane mono (meth) acrylate and pentaerythritol mono(meth)acrylate, and also mixtures of the above-mentioned vinyl monomers.

Preference is given to the use of acrylic or methacrylic esters of monoalcohols which contain 1 to 18 carbon atoms, preferably n-butyl methacrylate, methyl methacrylate, isobutyl acrylate, 2-ethylhexyl acrylate and, in particular, butyl acrylate. Further suitable monomers are styrene, vinyltoluene, α-methylstyrene or more highly substituted styrenes such as 2,4-dimethylstyrene, and also vinyl esters of monocarboxylic acids containing from 2 to 15 carbon atoms, for example, vinyl acetate, vinyl propionate, vinyl pivalate or vinyl Versatate. Particularly preferred in this context are styrene, vinyltoluene and α-methylstyrene. Further suitable unsaturated monomers include hydroxyalkyl acrylates, preferably hydroxyethyl (meth) acrylate or hydroxypropyl (meth)acrylate, or unsaturated monomers containing 1,2-epoxide groups, such as glycidyl (meth) acrylate. Monomers of this kind, because of their reactive groups, cannot be added until after the synthesis of the aminoepoxy resin or of the blocked isocyanate.

The proportion by mass of unsaturated monomers or polymer (C) is generally from about 1 to 80%, preferably from 5 to 30%, based on the overall mass of components (A), (B) and (C), in each case calculated as solids.

The mixing ratio of components (A) to (B) is such as to impart desired curing by (B) of (A), and is preferably between 90:10 and 60:40% and is determined empirically from the optimum achievable performance properties at the given baking temperature. Components (A) and (B), preferably in the form of their mixtures with the unsaturated monomers, can either be mixed cold in the ratio described or else component (B) is added at elevated temperature to component (A) which is produced in situ. Subsequently, additives and acids which are customary in paint processing may then be added as desired.

The crosslinking of the generally OH-containing component (A) with blocked polyisocyanates (B) can, if desired, be accelerated by adding from 0.01 to 2%, specifically from 0.5 to 1%, based on the sum of the masses of components (A) and (B), of strongly basic tertiary amines and/or active metal compounds. A particular and sometimes synergistic effect is achieved if the OH-containing resin deposited is present in a strongly basic medium and the metal salts taken are those of bismuth, lead, cobalt, iron, antimony and/or tin(II) and tin(IV). Particular preference is given to catalysts such as iron (III) acetylacetonate, dibutyltin dilaurate, tri-n-butyltin oxide, dibutyltin dioctylmaleate, tin octoate, tin oleate, tetrabutyl titanate and/or cobalt 2-ethylhexoate.

In order to balance the performance properties, it is advantageous for the cathodically depositable resin to contain, in addition to the crosslinking agent (B), a proportion by mass of up to 15%, preferably from 1 to 10%, of hydroxy- and/or amino- and/or epoxy-functional monomers which contain double bonds and are able to react with the blocked polyisocyanates and the amino-epoxy resin.

By protonation with acids the cationic binder mixture is rendered dilutable with water in a manner known per se. Any desired acids can be used. Examples of acids include formic acid, lactic acid, acetic acid, propionic acid, citric acid, malonic acid, acrylic acid, phosphoric acid or an alkylphosphoric acid. Monobasic, low molecular weight organic carboxylic acids are preferred. The amount of acid added should be at least sufficient to ensure a stable emulsification of the ionic, generally cationic base resin. An excess of acid, i.e., a degree of neutralization of over 100%, should expediently be avoided. The MEQ value (specific acid content in the solid resin, conventionally expressed as mmol/100 g) is in general between 20 and 80 mmol/100 g. The aim is to achieve as low as possible a specific acid content, so as to obtain as high as possible a deposition equivalent. This mixture is then processed further to give an emulsion with demineralized water which is at a preferred temperature of from 60 to 95° C.

In the resulting emulsion, free-radical initiators can be added in order subsequently to polymerize the unsaturated monomers present to give polymer (C), in accordance with known emulsion polymerization techniques, to give dispersions, which generally having a solids content from 30 to 60%, preferably from 30 to 40% dispersions. The free-radical initiators used may be both all known redox systems and thermally decomposing free-radical initiators, such as azo compounds, peroxides, per-acid esters and hydroperoxides. Preference is given to combinations with reducing agents, such as tert-butyl hydroperoxide/ascorbic acid.

The molecular masses of the resulting polymeric resins (C), determined by the gel permeation chromatography method, are generally between 10,000 and 2,000,000 g/mol, preferably between 30,000 and 600,000 g/mol. For fine adjustment of appropriate molecular masses it is possible, if desired, to employ regulators such as, for example, alcohols, polyethers, thiols or hypophosphorous acid. The polymerization temperatures are in general between about 20 and 95° C. They depend on the desired molecular weight range, on the polymerization initiators used, and on the activity optimum of the latter.

The dispersions according to the invention are outstandingly suitable as ionically stabilized, water-based binders which are particularly suitable for further processing to give electrodeposition coating materials. These electrodeposition coating materials based on the dispersions according to the invention may contain any customary additives, such as lead silicate as a corrosion prevention pigment. A particular advantage, however, is that the dispersions according to the invention are suitable for lead-free electrode-position coating materials.

In the examples which follow, all mention of percentages or parts relates to contents by mass, unless stated otherwise. The examples illustrate the invention, but do not limit it.

EXAMPLES

Preparation examples

I. styrenization of bisphenol A (bisA—S)

289.45 g of styrene, 317.30 g of bisphenol A, 0.57 g of boric acid and 1.35 g of oxalic acid are placed in a three-neck flask fitted with reflux condenser and stirrer, and the mixture is heated at 120° C. under protective gas (nitrogen). The mixture is subsequently maintained at 120° C. until a solids content (1 g, 160° C., 0.5 h) of more than 95% has been reached. The melt is then drained off into pans, and the solid formed after cooling to room temperature is comminuted.

II. Epoxy resins

Base batch:

In a 6 1 four-neck flask with reflux condenser and stirrer, a 20% strength catalyst solution of 4-dimethylaminopyridine in Texanol®[1)] is added to a mixture, heated to 120° C., of Epikote®[2)] 828 R and bisphenol A or styrenized bisphenol A—S (Example I). The mixture is subsequently heated to 150° C. and maintained at this temperature until the EEW value mentioned in Table 1 (molecular mass divided by the number of epoxide groups per molecule) has been reached. The heating is then switched off and the batch is diluted with methoxypropanol or styrene to a solids content by mass of 70% or, respectively, 80%. The results are reported in Table 1 below.

1) Texanol is an isomer mixture of trimethylpentane diol mono isobutyrate.

2) Epikote 828 R is a liquid epoxy resin based on bisphenol A with an epoxy group content of approx. 5400 mmol/kg.

TABLE 1

| Epoxy resin | 2 | 3 | 4 | 5 |
|---|---|---|---|---|
| Epikote 828 | 1986.0 g | 1986.0 g | 1986.0 g | 1986.0 g |
| Bisphenol A | 589.0 g | 589.0 g | | |
| BisA-S from Example 1 | | | 1126.6 g | 1126.6 g |
| Catalyst solution | 2.6 g | 2.6 g | 3.1 g | 3.1 g |
| EEW value (g/mol) | 451 | 451 | 545 | 545 |
| Methoxypropanol | 1104.0 g | — | 1334.0 g | — |
| Styrene | | 644.0 g | | 778 |
| Solids content | 70% | 80% | 70% | 80% |

III. Epoxy-amine adducts

The epoxy resin prepared in Example II (Table 1) is placed in a 2 1 three-neck flask with reflux condenser and stirrer and is diluted with methoxypropanol or styrene. Subsequently, diethanolamine is added to the solution at from 40 to 50° C. The mixture is maintained at the temperature indicated until the EEW value noted in Table 2 has been reached. Then dimethylaminopropylamine and an adduct of 1 mol hexa-ethylenediamine (HMDA) and 2 mol of Cardura® E 10[3)] (E 10) are added, and the mixture is heated to 120° C. and maintained at this temperature until a EEW value of more than 10,000 g/mol and the corresponding amine number have been reached. The results are reported in Table 2 below.

3) Cardura® E 10 is a glycidyl ester of ®Versatic acid (α-branched $C_9$–$C_{10}$ aliphatic monocarboxylic acid).

TABLE 2

| Batch | 2-2 | 3-2 | 4-2 | 5-2 |
|---|---|---|---|---|
| Epoxy resin (Table 1) | 920.4 g | 805.4 g | 1112.3 g | 973.3 g |
| Methoxypropanol | 162.1 g | — | 176.8 g | — |
| Styrene | — | 187.6 g | — | 211.7 g |
| Diethanolamine | 52.5 g | 52.5 g | 52.5 g | 52.5 g |
| EEW value (in solution) in g/mol | 1221 | 1124 | 1443 | 1331 |
| Dimethylaminopropylamine | 19.4 g | 19.4 g | 19.4 g | 19.4 g |
| Adduct (E 10 + HMDA) | 97.6 g | 97.6 g | 97.6 g | 97.6 g |
| Amine number (solution) | 53.7 | 57.8 | 46.1 | 49.6 |
| Solids content by mass | 65% | 70% | 65% | 70% |

IV. Urethane curing agents 522 g of tolylene diisocyanate and 544 g of toluene are introduced as initial charge into a 2 1 four-neck flask with reflux condenser, distillation bridge and stirrer at room temperature. A mixture of 134 g of trimethylolpropane and 354 g of butylglycol is then metered in at a rate such that the temperature does not exceed 100° C. The mixture is subsequently stirred at from 90 to 100° C. until the NCO value is below 0.1%, and then 136.44 g of Texanols and 54.58 g of 2-ethylhexanol are added.

V. Dispersions a) Procedure for batch 2-3 and 4-3 (Table 3):

The 65% strength resin solution 2—2 or 4-2, respectively, is charged to a reaction vessel with stirrer, reflux condenser and distillation bridge and is heated to 85° C., and the solvent is distilled off in vacuo. As soon as no more distillate goes over, the curing agent prepared in Example IV is added. After homogenization for about 15 minutes at 85° C., the mixture is neutralized with formic acid and dispersed with dionized water. Fine (particle size below 500 nm) dispersions 2-3 and 4-3 are obtained with a solids content by mass of 30%.

b) Procedure for batch 3—3 and 5-3 (Table 3):

The 70% strength resin solution 3-2 or 5-2, respectively, is charged to a reaction vessel with stirrer and reflux condenser and is heated to 90° C. Then dodecanethiol, hydroxyethyl methacrylate and the curing agent prepared in Example IV are added (Table 3). Stirring is subsequently continued for about 15 minutes at 90° C. and then the mixture is neutralized with formic acid and dispersed with deionized water.

Half of the indicated quantity of Trigonox® A 80 are then added, the mixture is homogenized for about 15 minutes and subsequently, over the course of 20 minutes, a 10% solution of ascorbic acid in deionized water is metered in at 90° C. After one hour of reaction at 90° C., the second half of Trigonox A 80 is added and the batch is polymerized for 2 more hours at 90° C.

Fine (particle size below 500 nm) dispersions 3—3 and 5-3 are obtained with a solids content by mass of 30%. The results are given in Table 3.

TABLE 3

| Batch | 2-3 | 3-3 | 4-3 | 5-3 |
|---|---|---|---|---|
| Resin solution from Table 2 | 1252.0 g | 1162.5 g | 1458.6 g | 1354.5 g |
| Distillate | 438.2 g | — | 510.0 g | — |
| Curing agent from Example IV | 430.2 g | 614.4 g | 501.1 g | 716.0 g |
| Dodecylmercaptan | — | 15.4 g | — | 17.9 g |
| 85% formic acid | 18.9 g | 27.4 g | 22.0 g | 31.4 g |
| Hydroxyethyl methacrylate | — | 10.8 g | — | 12.6 g |
| Trigonox A 80 | — | 7.8 g | — | 9.1 g |
| Ascorbic acid | — | 6.1 g | — | 7.1 g |
| Deionized water | 2612.3 g | 3778.6 g | 3043.5 g | 4403.1 g |
| Solids content by mass | 30% | 30% | 30% | 30% |

VI. Clearcoats

The synthetic resin dispersions prepared in Section V are diluted with deionized water, thereby converting them into clearcoats having a solids content of 15%, and stirred for 2 hours. Subsequently, at 32° C., metal panels are coated, with the application of voltage and a deposition time of 150 seconds. The panels are baked at 180° C. for 20 minutes. A smooth, craterless film is obtained. The films are detached from the panel in order to determine the glass transition temperature (by means of DSC=dynamic differential calorimetry: Perkin Elmer DSC) and the complex viscosity. The results of the measurements are shown in Table 4.

TABLE 4

| Clearcoat | CC-1 | CC-2 | CC-3 | CC-4 |
|---|---|---|---|---|
| Dispersion | 2-3 | 3-3 | 4-3 | 5-3 |
| Voltage | 300 V | 300 V | 300 V | 300 V |
| Layer thickness | 10 μm | 23 μm | 24 μm | 33 μm |
| Glass transition temperature | 39.5° C. | 36.2° C. | 40.2° C. | 34.2° C. |
| Viscosity* 150° C., 0.01 Hz | 246 Pas | 120 Pas | 92.9 Pas | 66.5 Pas |

*Viscosity: Plate-cone measurement of the complex viscosity by oscillation using a shear stress-controlled rheometer (Bohlin CS).

Other embodiments of the invention will be apparent to those skilled in the art from consideration of the specification and practice of the invention disclosed herein. It is intended that the specification be considered as exemplary only.

What is claimed is:

1. A process for preparing an aqueous synthetic resin dispersion comprising preparing an ionic resin (A) containing moieties derived from aralkylated epoxy resins from a bisphenol substituted with at least one aralkyl group, in the presence of olefinically unsaturated monomers, dispersing the ionic resin (A) in water, and polymerizing by free-radical polymerization the olefinically unsaturated monomers in the presence of the ionic resin (A) and a blocked polyisocyanate (B), to form a polymer (C).

2. A process as claimed in claim 1, wherein after the preparing step, the olefinically unsaturated monomers, the ionic resin (A) and the blocked polyisocyanate (B) are converted into an aqueous dispersion, and then the polymerizing step occurs.

3. A process as claimed in claim 1, wherein the component (A) comprises a cationic aralkylated epoxy resin.

4. A process as claimed in claim 1, wherein the component (A) comprises a cationic epoxy-amine resin formed from an aralkylated epoxy resin.

5. A process as claimed in claim 1, wherein component (A) comprises a cationic epoxy-amine resin formed from an aralkylated epoxy resin, wherein the epoxy-amine resin has an amine number of from 30 to 150 mg of KOH/g.

6. A process as claimed in claim 1, wherein component (A) comprises a cationic epoxy-amine resin formed from an aralkylated epoxy resin, wherein the epoxy-amine resin has a hydroxyl number of from 50 to 500 mg of KOH/g.

7. A process as claimed in claim 1, wherein component (A) comprises a cationic epoxy-amine resin formed from an aralkylated epoxy resin, wherein the epoxy-amine resin has a number-average molecular mass (Mn) of from 250 to 10,000 g/mol.

8. A process as claimed in claim 1, wherein component (A) comprises a cationic epoxy-amine resin formed from a styrenized epoxy resin.

9. A process as claimed in claim 1, wherein component (A) is formed from an aralkylated polyglycidyl ether.

10. A process as claimed in claim 9, wherein some of the aralkylated polyglycidyl ether is replaced by an aliphatic polyglycidyl ether of the formula $$\underbrace{CH_2—CH}_{O}—CH_2—[O—(CHR^5)_v]_w—O—CH_2—\underbrace{CH—CH_2}_{O}$$

where $R^5$ is H or an alkyl radical having 1 to 6 carbon atom which is optionally substituted, v is an integer from 2 to 6, and w is an integer from 5 to 50.

11. A process as claimed in claim 4, wherein the amine used for the preparation of the cationic epoxy-amine resin is selected from the group consisting of primary linear and branched alkyl or alkanol amines having 1 to 12 carbon atoms in the alkyl or alkanol radical, dialkylaminoalkylamines and alkoxyalkylamines having a total of 3 to 14 carbon atoms, secondary amines, dihydroxyalkylamines, and cyclic amines having a total of 2 to 14 carbon atoms.

12. A process as claimed in claim 4, wherein the amine employed for the preparation of the cationic epoxy-amine resins comprises one or more of primary amines of the formula $$H_2N—CR^1R^2—R^3—O(CHR^4—CHR^5O)_nR^6$$

and secondary amines of the formula $$H—N—CR^1R^2—R^3—O(CHR^4—CHR^5O)_n—R^3—CR^1R^2—N—H$$

where $R^1$ and $R^2$ are hydrogen, or alkyl or $—CH_2—OH$ groups, $R^3$ is a linear or branched alkylene radical, $R^4$ and $R^5$ are hydrogen or alkyl radicals having 1 to 4 carbon atoms, $R^6$ is hydrogen, an alkyl, cycloalkyl or phenyl radical, and n is an integer from 0 to 5.

13. A process as claimed in claim 1, wherein component B comprises a blocked aliphatic, araliphatic, cycloaliphatic, or aromatic, di- or polyisocyanates, mixtures of the such isocyanates, or mixtures of the di- and polyisocyanates with monoisocyanates.

14. A process as claimed in claim 1, wherein a portion of the blocking agents of the isocyanate compounds employed contains at least one olefinically unsaturated group.

15. A process as claimed in claim 1, wherein the unsaturated monomers used to form polymer C are selected from the group consisting of aromatic vinyl compounds, vinyl ethers, vinyl esters of aliphatic monocarboxylic acids having 2 to 18 carbon atoms, esters of $\alpha,\beta$-unsaturated acids, monoesters of $\alpha,\beta$-unsaturated acids with polyhydric alcohols, hydroxyalkyl crotonates having 2 to 12 carbon atoms and from one to three free hydroxyl groups in the alcohol group, neopentylglycol mono(meth)acrylate, trimethylolpropane mono(meth)acrylate and pentaerythritol mono(meth)acrylate, and from mixtures of these vinyl monomers.

16. A process as claimed in claim 1, wherein the formed dispersion is free of organic solvents.

* * * * *